US012510835B2

(12) United States Patent
Takahashi et al.

(10) Patent No.: US 12,510,835 B2
(45) Date of Patent: Dec. 30, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Koji Takahashi, Chiba (JP); Yasuo Kojima, Chiba (JP); Motoya Yamada, Chiba (JP); Masayuki Shinozuka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 497 days.

(21) Appl. No.: 18/306,763

(22) Filed: Apr. 25, 2023

(65) Prior Publication Data

US 2024/0103390 A1 Mar. 28, 2024

(30) Foreign Application Priority Data

Apr. 28, 2022 (JP) ................................ 2022-075310
Mar. 28, 2023 (JP) ................................ 2023-052157

(51) Int. Cl.
*G03G 5/10* (2006.01)
*G03G 15/00* (2006.01)
(Continued)

(52) U.S. Cl.
CPC ......... *G03G 5/102* (2013.01); *G03G 15/0105* (2013.01); *G03G 15/0808* (2013.01); *G03G 15/6597* (2013.01); *G03G 21/1814* (2013.01)

(58) Field of Classification Search
CPC ................................ G03G 5/10; G03G 5/102
See application file for complete search history.

(56) References Cited

U.S. PATENT DOCUMENTS 8,457,528 B2 6/2013 Ochi
8,865,380 B2 10/2014 Noguchi
(Continued)

FOREIGN PATENT DOCUMENTS

JP 2009-150958 A 7/2009
JP 2017-111409 A 6/2017
WO 2019/077705 A1 4/2019

OTHER PUBLICATIONS

Kobelnics, No. 28, vol. 14, Oct. 2005, pp. 1-3.
(Continued)

*Primary Examiner* — Peter L Vajda
(74) *Attorney, Agent, or Firm* — VENABLE LLP

(57) ABSTRACT

Provided is an electrophotographic photosensitive member including: a support; and a photosensitive layer, wherein the support has a surface formed of Al and/or an Al alloy, wherein the surface of the support comprises Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein the ratio of an area occupied by the Al crystal grain having the (γ) is 10% or less, and the value of the ratio of an area occupied by the Al crystal grain having the (α) to an area occupied by the Al crystal grain having the (β) is more than 4/6 and less than 6/4.

8 Claims, 3 Drawing Sheets

(51) Int. Cl.

| | |
|---|---|
| ***G03G 15/01*** | (2006.01) |
| ***G03G 15/08*** | (2006.01) |
| ***G03G 21/18*** | (2006.01) |

(56) References Cited

U.S. PATENT DOCUMENTS

| | | | | |
|---|---|---|---|---|
| 9,114,565 | B2 | 8/2015 | Kawai | |
| 9,389,521 | B2 | 7/2016 | Takahashi | |
| 9,766,561 | B2 | 9/2017 | Takahashi | |
| 9,772,596 | B2 | 9/2017 | Mitsul | |
| 10,042,273 | B2 | 8/2018 | Takahashi | |
| 10,338,486 | B2 | 7/2019 | Abe | |
| 10,429,754 | B2 | 10/2019 | Takahashi | |
| 10,558,132 | B2 | 2/2020 | Ishiduka | |
| 10,642,175 | B2 | 5/2020 | Ohira | |
| 11,112,707 | B2 | 9/2021 | Takahashi | |
| 11,506,988 | B2 | 11/2022 | Takahashi | |
| 2018/0275538 | A1* | 9/2018 | Kawasaki | G03G 5/0631 |
| 2019/0384191 | A1 | 12/2019 | Kobayashi | |
| 2022/0276577 | A1 | 9/2022 | Takahashi | |
| 2022/0276578 | A1 | 9/2022 | Yamada | |
| 2022/0283522 | A1 | 9/2022 | Shinozuka | |

OTHER PUBLICATIONS

U.S. Appl. No. 18/300,968, filed Apr. 14, 2023, Yasuo Kojima.
U.S. Appl. No. 18/306,431, filed Apr. 25, 2023, Motoya Yamada.
U.S. Appl. No. 18/306,758, filed Apr. 25, 2023, Masayuki Shinozuka.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

In recent years, the diversification of the users of an electrophotographic apparatus has been advancing, and hence there has been a growing need for improvements in quality and stability of an image to be output as compared to a conventional image.

In International Publication No. WO2019/077705, as a technology concerning an improvement in image quality, there is a description of a technology including setting the internal stress value of an electroconductive support within the range of from −30 to 5 MPa.

In Japanese Patent Application Laid-Open No. 2009-150958, as a technology of improving image quality from the viewpoint of accuracy, there is a description of a technology including heating an element tube made of an aluminum alloy at from 190 to 550° C. before its cutting.

In addition, in Japanese Patent Application Laid-Open No. 2017-111409, there is a description of a technology including setting the average area of the crystal grains of an Al alloy having specific composition to from 3 to 100 $\mu m^2$.

An investigation made by the inventors of the present invention has found that the electrophotographic photosensitive members described in International Publication No. WO2019/077705, Japanese Patent Application Laid-Open No. 2009-150958, and Japanese Patent Application Laid-Open No. 2017-111409 each have room for a further reduction in potential fluctuation.

SUMMARY OF THE INVENTION

Accordingly, an object of the present invention is to provide an electrophotographic photosensitive member, which further suppresses potential fluctuation and can reduce even a difference in potential fluctuation due to a difference in storage environment caused by the fluctuation.

The object is achieved by the present invention described below. That is, an electrophotographic photosensitive member according to one aspect of the present invention is an electrophotographic photosensitive member including: a support having a cylindrical shape; and a photosensitive layer, wherein the support has a surface formed of Al and/or an Al alloy, wherein the surface of the support comprises Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein a ratio of an area occupied by Al crystal grain having the (γ) to a total area of the surface of the support is 10% or less, and a value of a ratio of an area occupied by Al crystal grain having the (α) to an area occupied by Al crystal grain having the (β) is more than 4/6 and less than 6/4.

In addition, a process cartridge according to another aspect of the present invention is a process cartridge including: the above-mentioned electrophotographic photosensitive member; and at least one unit selected from the group consisting of: a charging unit; a developing unit; and a cleaning unit, the process cartridge integrally supporting the electrophotographic photosensitive member and the at least one unit, and being removably mounted onto a main body of an electrophotographic apparatus.

In addition, an electrophotographic apparatus according to still another aspect of the present invention includes: the above-mentioned electrophotographic photosensitive member; a charging unit; an exposing unit; a developing unit; and a transferring unit.

Further features of the present invention will become apparent from the following description of exemplary embodiments with reference to the attached drawings.

DESCRIPTION OF THE EMBODIMENTS

The present invention is described in detail below by way of an exemplary embodiment.

The inventors of the present invention have made an investigation, and as a result, have found that in each of the technologies described in International Publication No. WO2019/077705, Japanese Patent Application Laid-Open No. 2009-150958, and Japanese Patent Application Laid-Open No. 2017-111409, potential fluctuation becomes larger owing to the characteristics of the crystal of the Al or Al alloy of the support of the electrophotographic photosensitive member.

To solve the above-mentioned technical problem that has occurred in the related art, the inventors of the present invention have made an investigation on the crystal orientations of the surface of an aluminum-made support.

As a result of the above-mentioned investigation, the inventors have found that the use of the following electrophotographic photosensitive member according to the present invention can solve the above-mentioned technical problem.

That is, an electrophotographic photosensitive member according to one aspect of the present invention is an electrophotographic photosensitive member including a support and a photosensitive layer, wherein the support has a surface formed of Al and/or an Al alloy, wherein the surface of the support comprises Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and wherein a ratio of an area occupied by Al crystal grain having the (γ) to a total area of the surface of the support is 10% or less, and a value of a ratio of an area occupied by Al crystal grain having the (α) to an area occupied by Al crystal grain having the (β) is more than 4/6 and less than 6/4.

In the present invention, for example, the term "plane at −15° or more and less than +15° with respect to a {111} orientation" refers to a crystal plane having a plane variation of −15° or more and less than +15° with respect to the {111} orientation in an Al crystal.

The inventors of the present invention have conceived the mechanism via which the configuration of the present invention can solve the above-mentioned technical problem in the related art to be as described below.

Figure 1A:
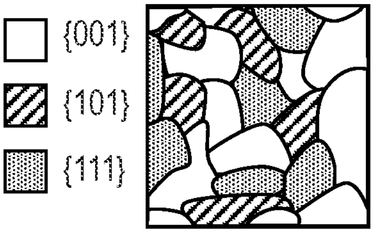
FIG. 1A is a view for illustrating a distribution of Al crystal grains.

Aluminum (Al) has the following three crystal orientations according to a broad classification: a {101} orientation, a {001} orientation, and a {111} orientation. As described in "Kobelnics" ([No. 28], Vol. 14, 2005. OCT), in general, for example, as illustrated in FIG. 1A, crystal grains having the respective crystal orientations are randomly distributed.

The inventors of the present invention have made the following assumption. The ease with which the crystal grains flow electrons therethrough varies depending on their crystal orientations, and the crystal grains each having the (α) and the crystal grains each having the (β) flow electrons therethrough more easily than the crystal grains each having the (γ) do. As a result of an investigation, the crystal grains are arranged in order of decreasing ease with which an electron is flowed as follows: crystal grains each having (β)>crystal grains each having (α)>crystal grains each having (γ).

It is conceived that in an aluminum-made support in the related art, crystal grains having the three kinds of crystal orientations are present at random, and hence the potential fluctuation has tended to be relatively large owing to the crystal grains each having the (γ).

Figure 1B:
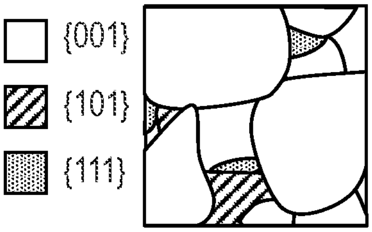
FIG. 1B is a view for illustrating a distribution of Al crystal grains.
Figure 1C:
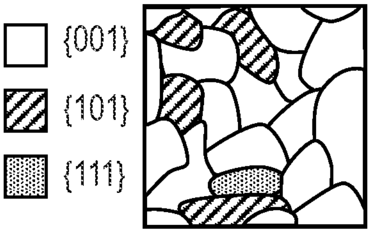
FIG. 1C is a view for illustrating a distribution of Al crystal grains.

In view of the foregoing, the surface of the aluminum-made support is formed under a state in which the amount of the crystal grains each having the (α) or the crystal grains each having the (β), which are assumed to easily flow electrons therethrough, is large as illustrated in, for example, each of FIG. 1B and FIG. 1C. Thus, the conductivity of the surface of the aluminum-made support is further improved to suppress the remaining of electrons, and probably as a result of the foregoing, the potential fluctuation can be suppressed.

Further, an investigation made by the inventors of the present invention has found that when the surface of the support is formed under a state in which the amount of the crystal grains each having the (α) or the crystal grains each having the (β) is large as described above, the potential fluctuation can be suppressed, but at a certain ratio of the crystal grains each having the (α) to the crystal grains each having the (β), the following new problem is present: the potential fluctuation varies depending on an environment in which the support is stored.

The inventors have conceived the reason why the potential fluctuation varies depending on the difference in storage environment to be as described below. The surface free energy of an aluminum crystal varies depending on its orientation, and hence the corrosiveness thereof varies depending thereon. It can be expected from the magnitude of the surface free energy that the crystal grains each having the (β) are least corrosion-resistant, and the crystal grains each having the (γ) are most corrosion-resistant. The inventors of the present invention have assumed that the difference in corrosiveness may cause the difference in potential fluctuation due to the difference in storage environment. In other words, the inventors of the present invention have conceived that the surface free energy of aluminum has the following characteristic: the difference in potential fluctuation due to the difference in storage environment can be suppressed by forming the surface of the aluminum-made support from the crystal grains each having the (α) or the crystal grains each having the (γ), which have relatively small surface free energy.

The inventors of the present invention have found from such idea that the above-mentioned composite problem of the magnitude of the potential fluctuation and the change in fluctuation by the environment in which the support is stored can be solved by: reducing the amount of the crystal grains each having the (γ) that flow electrons therethrough least easily; and controlling the ratio of the crystal grains each having the (α), which flow electrons therethrough relatively easily and have small surface free energy, to the crystal grains each having the (β), which flow electrons therethrough easily.

[Electrophotographic Photosensitive Member]

An electrophotographic photosensitive member according to the present invention includes a support and a photosensitive layer.

An example of a method of producing the electrophotographic photosensitive member according to the present invention is a method including: preparing coating liquids for respective layers to be described later; applying the liquids in a desired layer order; and drying the liquids. In this case, examples of a method of applying each of the coating liquids include dip coating, spray coating, inkjet coating, roll coating, die coating, blade coating, curtain coating, wire bar coating, and ring coating. Of those, dip coating is preferred from the viewpoints of efficiency and productivity.

The support and the respective layers are described below.

<Support>

The electrophotographic photosensitive member according to the present invention includes a support having a cylindrical shape, and the surface of the support is formed of at least any one selected from Al and an Al alloy. In addition, the surface of the support may be subjected to, for example, hot water treatment, blast treatment, or cutting treatment.

(1) Crystal Orientation

An expression of an Al crystal orientation in the surface direction of the surface of the support according to the present invention, for example, a plane of the {001} orientation represents an Al crystal plane with Miller indices. That is, the plane of the {001} orientation is the comprehensive expression of Miller indices representing any one of crystal lattice planes (001), (010), (100), (00-1), (0-10), and (−100).

In the present invention, the surface of the support includes Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and a ratio of an area occupied by Al crystal grains each having the (γ) to a total area of the surface of the support is 10% or less, and a value of a ratio of an area occupied by Al crystal grains each having the (α) to an area occupied by Al crystal grains each having the (β) is more than 4/6 and less than 6/4.

From the viewpoint of improving the ease with which an electron is flowed and the corrosiveness of the support, the value of the ratio of the area occupied by the Al crystal grains each having the (α) to the area occupied by the Al crystal grains each having the (β) needs to be more than 4/6 and less than 6/4. However, in consideration of, for example, a production cost for the support and a time period required for the adjustment of the ratio, the value of the ratio of the area occupied by the Al crystal grains each having the (α) to the area occupied by the Al crystal grains each having the (β) is preferably from 41/59 to 59/41.

The ratio of the area occupied by the Al crystal grains each having the (α) to the area occupied by the Al crystal grains each having the (β) is more preferably from 45/55 to 55/45. When the ratio falls within the range, the effect of the present invention can be obtained to a larger extent.

From the viewpoint of reducing a plane that flows electrons therethrough less easily, the ratio of the area occupied by the Al crystal grains each having the (γ) to the total area of the surface of the support is preferably 5% or less.

(Method of measuring Crystal Orientations of Al Crystal Grains in Surface of Support)

In the present invention, the crystal orientations of the Al crystal grains in the surface of the support may be measured, for example, as described below.

First, the surface of the support is treated, for example, by buffing and with an aqueous solution of sodium hydroxide, and the measurement of the crystal orientations of the Al crystal grains is performed for points within 20 μm from the surface of the support before the treatment. The measurement of the crystal orientations is preferably performed by an SEM-EBSP method.

A Field Emission-Scanning Electron Microscope (FE-SEM) including an Electron Back Scatter diffraction Pattern (EB SP) detector is used for the measurement by the SEM-EBSP method. Herein, the "EBSP" refers to a Kikuchi pattern (Kikuchi lines) obtained from backscattered electrons occurring when an electron beam is allowed to enter the surface of a test piece, and the crystal orientations at the electron beam incidence position can be determined by analyzing the pattern. In addition, the "Kikuchi pattern" refers to a pattern that appears behind an electron diffraction image in a pair of white and black parallel lines, in a band shape, or in an array shape at the time of the scattering and diffraction of electron beams hit on a crystal.

For example, a field emission scanning electron microscope (product name: JSM-6500F, manufactured by JEOL Ltd.) may be used as the FE-SEM including the EB SP detector.

(2) Area Occupied by Al Crystal Grains in Surface of Support

In the present invention, the surface of the support includes Al crystal grains having: (α) a plane at −15° or more and less than +15° with respect to a {001} orientation; (β) a plane at −15° or more and less than +15° with respect to a {101} orientation; and (γ) a plane at −15° or more and less than +15° with respect to a {111} orientation, and a ratio of an area occupied by Al crystal grains each having the (γ) to a total area of the surface of the support is 10% or less, and a ratio of an area occupied by any one of the following Al crystal grains: the Al crystal grains each having the (α) or the Al crystal grains each having the (β) to the total area of the surface of the support is less than 60%.

The ratio of the area occupied by the Al crystal grains having each of the above-mentioned crystal orientations may be determined as described below.

Figure 2:
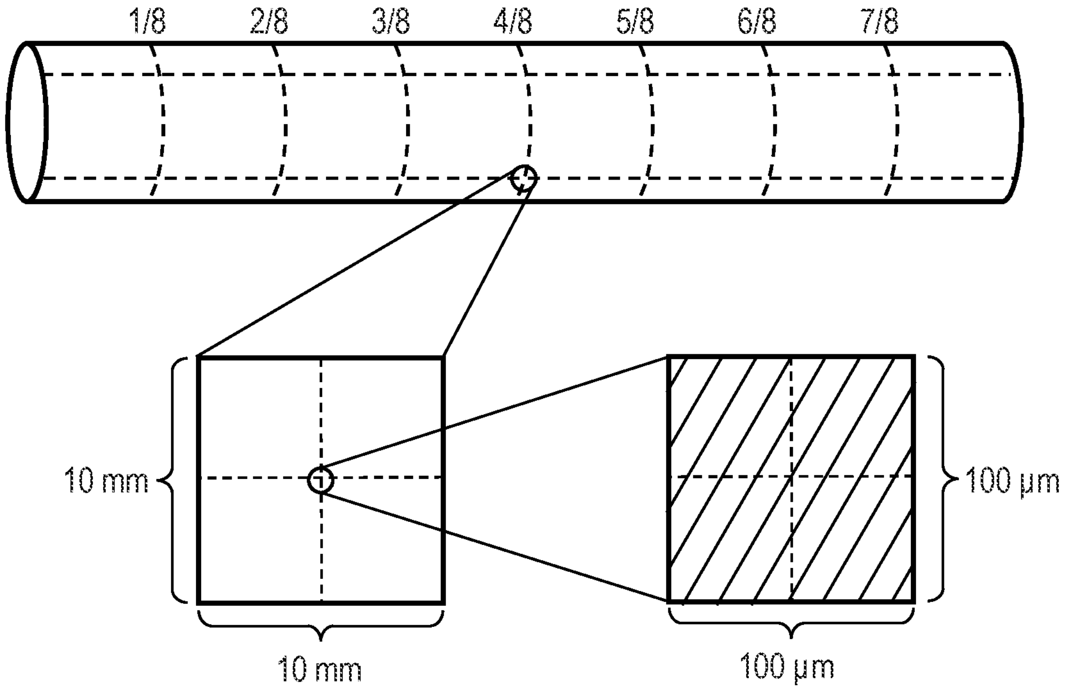
FIG. 2 is a view for illustrating the measurement position of an Al crystal grain.

As illustrated in FIG. 2, first, positions corresponding to ⅛, 2/8, ⅜, 4/8, ⅝, 6/8, and ⅞ of the full length of the support from one of the ends thereof in the axial direction thereof are determined. Further, at each of the positions, the support is divided into four parts of 90° each in the circumferential direction thereof. At each of the 28 points where the dividing lines in the axial direction and the dividing lines in the circumferential direction intersect, a 100-micrometer square region is set so that the point of intersection between the dividing line in the axial direction and the dividing line in the circumferential direction is at its center, and the measurement of the crystal orientations is performed by the above-mentioned SEM-EBSP method. Subsequently, for the Al crystal grains having the crystal orientations of (α), (β), and (γ), the area occupied by each orientation is calculated, and the resultant value is divided by 10,000 $\mu m^2$ to determine the ratio of the area occupied by the Al crystal grains having each crystal orientation in each region. Further, the ratio is multiplied by 100 to determine a percentage, and finally, the average of respective values obtained from the 28 regions is determined as the ratio of the area occupied by each of (α), (β), and (γ) in the support.

The area occupied by the Al crystal grains having each crystal orientation may be calculated using software included with the measurement apparatus, or may be calculated by, for example, subjecting the orientations obtained through the measurement to hue mapping of the regions of the Al crystal grains having the respective crystal orientations in which the hue "h" of an HSV color space is used to determine the range of (α) to be $0 \leq h < 60$ and $300 \leq h < 360$, the range of (β) to be $60 \leq h < 180$, and the range of (γ) to be $180 \leq h < 300$.

(3) Al Alloy to be Used as Support

The support is preferably formed of an Al alloy containing 0.05 to 0.2 mass % of Cu and 1.0 to 1.5 mass % of Mn from the viewpoint of controlling the crystal orientations, and the alloy is, for example, a 3000 series Al alloy such as a JIS A3003 alloy. Alternatively, the support is preferably formed of an Al alloy containing 0.45 to 0.9 mass % of Mg, and is preferably formed of a 6000 series Al alloy such as a JIS A6063 alloy. The JIS A3003 alloy is specifically an Al alloy containing 0.6 mass % or less of Si, 0.7 mass % or less of Fe, 0.05 to 0.2 mass % of Cu, 1.0 to 1.5 mass % of Mn, and 0.1 mass % or less of Zn. In addition, the JIS A6063 alloy is specifically an Al alloy containing 0.2 to 0.6 mass % of Si, 0.35 mass % or less of Fe, 0.1 mass % or less of Cu, 0.1 mass % or less of Mn, 0.45 to 0.9 mass % of Mg, 0.1 mass % or less of Cr, 0.1 mass % or less of Zn, and 0.1 mass % or less of Ti.

(4) Method of Producing Support

A method of producing the support is not particularly limited as long as the method enables the production of a support that satisfies the requirement of the present invention.

An example of the method of producing the support is a method including the following four steps:

- a step of preparing a specific Al alloy, and a first step of subjecting the prepared Al alloy to hot extrusion processing to provide a molded body;
- a second step of subjecting the molded body obtained in the first step to cold drawing;
- a third step of annealing the resultant after the second step; and
- a fourth step of cutting the surface of the annealed product after the annealing.

When the crystal orientations are controlled through annealing, the crystal orientations can be controlled by adjusting a temperature increase time, an annealing temperature, a maintenance time, and a cooling time.

In particular, when the annealing temperature is set to from 405 to 450° C., there occurs such recrystallization that planes of crystal grains having the {101} orientation and the {001} orientation appear on the surface. Accordingly, the ratio of the area occupied by the crystal grains having the {101} orientation and the {001} orientation in the surface of the support is increased.

Further, the crystal orientations are also changed by a temperature increase rate and a cooling rate, and hence it is preferred that the crystal orientations be controlled so that the temperature increase rate is 40° C./min or less, and a temperature decrease rate is 5° C./min or less until the temperature of the support becomes 150° C.

To cause sufficient recrystallization, the maintenance time is preferably set to 2 hours or more.

In addition, a thermal history is important at the time of the control of the crystal orientations, and hence a product that has undergone the above-mentioned steps of performing hot extrusion processing and cold drawing is preferably annealed before use.

<Electroconductive Layer>

In the present invention, an electroconductive layer may be arranged on the support. The arrangement of the electroconductive layer can conceal flaws and irregularities in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated construction having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably from 1 to 500 nm, more preferably from 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer has a thickness of preferably from 1 to 50 μm, particularly preferably from 3 to 40 μm.

The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the electroconductive particles in the coating liquid for an electroconductive layer, there are given methods including using a paint shaker, a sand mill, a ball mill, and a liquid collision-type high-speed disperser.

<Undercoat Layer>

In the present invention, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has a thickness of preferably from 0.1 to 50 μm, more preferably from 0.2 to 40 μm, particularly preferably from 0.3 to 30 μm.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate-type photosensitive layer and (2) a monolayer-type photosensitive layer. (1) The laminate-type photosensitive layer has a charge-generating layer containing a charge-generating substance and a charge-transporting layer containing a charge-transporting substance. (2) The monolayer-type photosensitive layer includes a photosensitive layer containing both a charge-generating substance and a charge-transporting substance.

(1) Laminate-type Photosensitive Layer

The laminate-type photosensitive layer includes the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably from 40 to 85 mass %, more preferably from 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer has a thickness of preferably from 0.1 to 1 μm, more preferably from 0.15 to 0.4 μm.

The charge-generating layer may be formed by preparing a coating liquid for a charge-generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

The content of the charge-transporting substance in the charge-transporting layer is preferably from 25 to 70 mass %, more preferably from 30 to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer has a thickness of from 5 to 50 μm, more preferably from 8 to 40 μm, particularly preferably from 10 to 30 μm.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coat thereof, and drying the coat. Examples of the charge-generating substance, the charge-transporting substance, and the resin are the same as those listed as the materials in the section "(1) Laminate-type Photosensitive Layer."

<Protective Layer>

In the present invention, a protective layer may be arranged on the photosensitive layer. The arrangement of the protective layer can improve durability.

The protective layer preferably contains electroconductive particles and/or a charge-transporting substance, and a resin.

Examples of the electroconductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protective layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has a thickness of preferably from 0.5 to 10 μm, more preferably from 1 to 7 μm.

The protective layer may be formed by preparing a coating liquid for a protective layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge according to the present invention is characterized in that the process cartridge integrally supports the electrophotographic photosensitive member described above and at least one unit selected from the group consisting of: a charging unit; a developing unit; and a cleaning unit, and is removably mounted onto the main body of an electrophotographic apparatus.

In addition, an electrophotographic apparatus according to the present invention is characterized by including the electrophotographic photosensitive member described above, a charging unit, an exposing unit, a developing unit, and a transferring unit.

Figure 3:
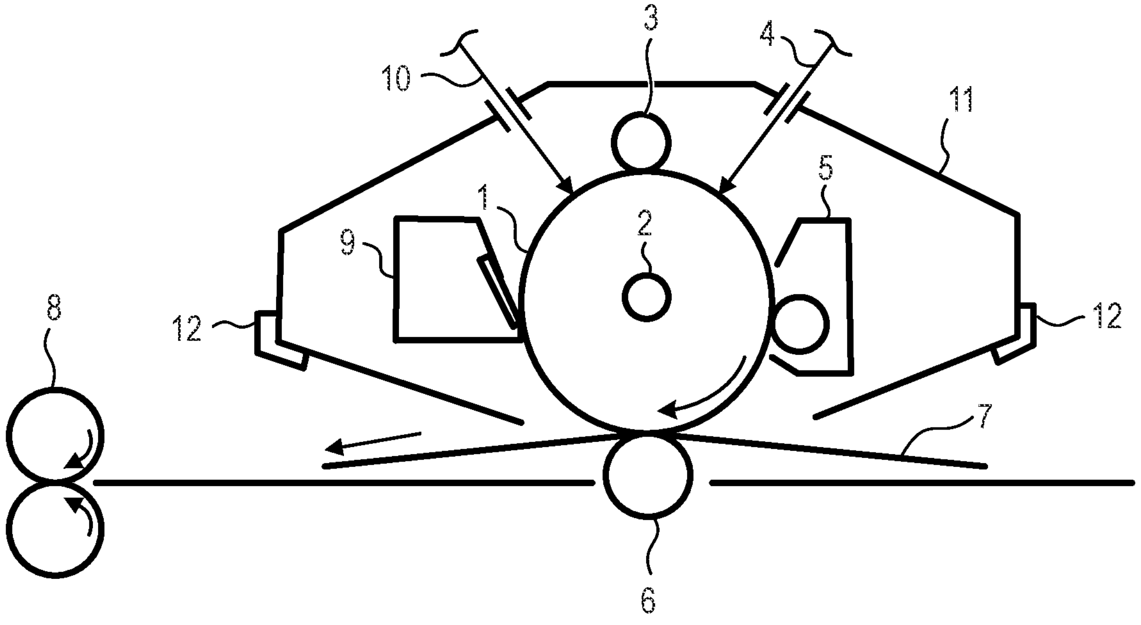
FIG. 3 is a view for illustrating an example of the schematic configuration of an electrophotographic apparatus including a process cartridge including an electrophotographic photosensitive member.

An example of the schematic configuration of an electrophotographic apparatus including a process cartridge including an electrophotographic photosensitive member is illustrated in FIG. 3.

An electrophotographic photosensitive member 1 having a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3.

Although a roller charging system based on a roller-type charging member is illustrated in FIG. 3, a charging system, such as a corona charging system, a contact charging system, or an injection charging system, may be adopted.

The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic apparatus.

The electrophotographic apparatus may include a cleaning unit 9 for removing a deposit such as the toner remaining on the surface of the electrophotographic photosensitive member 1 after the transfer. In addition, a so-called cleaner-less system in which the deposit is removed with the developing unit 5 or the like without separate arrangement of the cleaning unit 9 may be used.

The electrophotographic apparatus may include an electricity-removing mechanism for subjecting the surface of the electrophotographic photosensitive member 1 to electricity-removing treatment with pre-exposure light 10 from a pre-exposing unit (not shown). In addition, a guiding unit 12 such as a rail may be arranged for removably mounting a process cartridge 11 according to the present invention onto the main body of the electrophotographic apparatus.

The electrophotographic photosensitive member according to the present invention can be used in, for example, a laser beam printer, an LED printer, a copying machine, a facsimile, and a multifunctional peripheral thereof.

According to the present disclosure, the electrophotographic photosensitive member, which suppresses potential fluctuation and can reduce a difference in potential fluctuation due to a difference in storage environment, can be provided.

EXAMPLES

The present invention is described in more detail below by way of Examples and Comparative Examples. The present invention is by no means limited to the following Examples, and various modifications may be made without departing from the gist of the present invention. In the description in the following Examples, "part(s)" is by mass unless otherwise specified.

[Production of Support]

A support was produced by the following method.

Production Example of Support A-1

An extruded tube formed of a JIS A3003 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, increased in temperature at a temperature increase rate of 15° C./min, and then maintained at 450° C. for 2.5 hours. Subsequently, the drawn tube was cooled at 2° C./min until its temperature became 150° C., and was removed from the electric furnace after 24 hours.

The surface of the tube was subjected to mirror cutting after the annealing. Thus, "Support A-1" having an outer diameter of 30.5 mm, an inner diameter of 28.5 mm, and a length of 370 mm was obtained. The production conditions of Support A-1 are shown in Table 1.

The elemental analysis of the drawn tube used showed that the tube was formed of an Al alloy containing 0.16 mass % of Si, 0.2 mass % of Fe, 0.08 mass % of Cu, 1.3 mass % of Mn, and 0.02 mass % of Zn.

Production Examples of Supports A-2 to A-9

Supports were each produced in the same manner as in the production example of Support A-1 except that in the production example of Support A-1, the same drawn tube was used, and the annealing conditions were changed as shown in Table 1. The resultant supports are referred to as "Support A-2 to Support A-9." The production conditions of Supports A-2 to A-9 are shown in Table 1.

Production Example of Support B-1

An extruded tube formed of a JIS A6063 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, increased in temperature at a temperature increase rate of 15° C./min, and then maintained at 450° C. for 2 hours. Subsequently, the drawn tube was cooled at 2° C./min until its temperature became 150° C., and was removed from the electric furnace after 24 hours.

The surface of the tube was subjected to mirror cutting after the annealing. Thus, "Support B-1" having an outer diameter of 30.5 mm, an inner diameter of 28.5 mm, and a length of 370 mm was obtained. The production conditions of Support B-1 are shown in Table 1.

The elemental analysis of the drawn tube used showed that the tube was formed of an Al alloy containing 0.5 mass % of Si, 0.3 mass % of Fe, 0.07 mass % of Cu, 0.08 mass % or less of Mn, 0.7 mass % of Mg, 0.04 to 0.35 mass % of Cr, 0.08 mass % or less of Zn, and 0.06 mass % of Ti.

Production Examples of Support B-2 and Support B-3

Supports were each produced in the same manner as in the production example of Support B-1 except that in the production example of Support B-1, the same drawn tube was used, and the annealing conditions were changed as shown in Table 1. The resultant supports are referred to as "Support B-2 and Support B-3." The production conditions of Support B-2 and Support B-3 are shown in Table 1.

Production Examples of Support C-1 to Support C-10

Supports were each produced in the same manner as in the production example of Support A-1 except that in the production example of Support A-1, the annealing conditions were changed as shown in Table 1. The resultant supports are referred to as "Support C-1 to Support C-10." The production conditions of Support C-1 to Support C-10 are shown in Table 1.

Production Examples of Support C-11 and Support C-12

Annealing was performed with a drawn tube formed of an Al—Mg alloy containing 2.5 mass % of magnesium, the tube having an outer diameter of 30.8 mm, an inner diameter of 28.5 mm, and a length of 370 mm, under conditions shown in Table 1. After the annealing, the surface of the tube was subjected to mirror cutting. Thus, "Support C-11 and Support C-12" each having an outer diameter of 30.5 mm, an inner diameter of 28.5 mm, and a length of 370 mm were obtained. The production conditions of Support C-11 and Support C-12 are shown in Table 1.

Production Examples of Support C-13 and Support C-14

Supports were each produced in the same manner as in the production example of Support A-1 except that in the production example of Support A-1, the annealing conditions were changed as shown in Table 1. The resultant supports are referred to as "Support C-13 and Support C-14." The production conditions of Support C-13 and Support C-14 are shown in Table 1.

TABLE 1

| | | Annealing condition | | | |
|---|---|---|---|---|---|
| Support | Al alloy | Temperature increase rate [° C./min] | Annealing temperature [° C.] | Maintenance time [h] | Temperature decrease rate (up to 150° C.) [° C./min] |
| Support A-1 | A3003 | 15 | 450 | 2.5 | 2 |
| Support A-2 | A3003 | 17 | 450 | 2.5 | 2 |
| Support A-3 | A3003 | 20 | 450 | 2.5 | 2 |
| Support A-4 | A3003 | 13 | 450 | 2.5 | 2 |
| Support A-5 | A3003 | 10 | 450 | 2.5 | 2 |
| Support A-6 | A3003 | 15 | 450 | 2.5 | 5 |
| Support A-7 | A3003 | 15 | 450 | 2 | 5 |
| Support A-8 | A3003 | 17 | 450 | 2 | 5 |
| Support A-9 | A3003 | 10 | 450 | 2 | 5 |
| Support B-1 | A6063 | 15 | 450 | 2.5 | 2 |
| Support B-2 | A6063 | 20 | 450 | 2.5 | 2 |
| Support B-3 | A6063 | 10 | 450 | 2.5 | 2 |
| Support C-1 | A3003 | 5 | 360 | 2 | 5 |
| Support C-2 | A3003 | 5 | 550 | 2 | 5 |
| Support C-3 | A3003 | 5 | 250 | 4 | 5 |
| Support C-4 | A3003 | 5 | 400 | 2 | 5 |
| Support C-5 | A3003 | 5 | 220 | 1 | 5 |
| Support C-6 | A3003 | 5 | 210 | 0.5 | 5 |
| Support C-7 | A3003 | 5 | 200 | 2 | 5 |
| Support C-8 | A3003 | 5 | 300 | 2 | 5 |
| Support C-9 | A3003 | 2 | 200 | 2.5 | 2 |
| Support C-10 | A3003 | 2 | 550 | 2.5 | 2 |
| Support C-11 | Al—Mg alloy | 5 | 380 | 2 | 5 |
| Support C-12 | Al—Mg alloy | 5 | 420 | 2 | 5 |
| Support C-13 | A3003 | 5 | 500 | 2.5 | 10 |
| Support C-14 | A3003 | 15 | 405 | 2 | 5 |

<Production of Electrophotographic Photosensitive Member>

Production Example of Photosensitive Member A-1

Support A-1 was ultrasonically cleaned in an alkaline solution of having a pH of 10.5, then washed with pure water, and finally immersed in hot water at 95° C. for 60 seconds to be used as a support.

Next, 100 parts of zinc oxide particles (specific surface area: 19 $m^2/g$, powder resistivity: $3.6 \times 10^6$ Ωcm) serving as a metal oxide were stirred and mixed with 500 parts of toluene, and 0.8 part of a silane coupling agent was added to the mixture, followed by stirring for 6 hours. The silane coupling agent used is N-2-(aminoethyl)-3-aminopropylmethyldimethoxysilane (product name: KBM-602, manufactured by Shin-Etsu Chemical Co., Ltd.). After that, toluene was evaporated under reduced pressure, and the residue was dried under heating at 130° C. for 6 hours to provide surface-treated zinc oxide particles.

Next, the following materials were prepared.

| | |
|---|---|
| A butyral resin (product name: BM-1, manufactured by Sekisui Chemical Company, Limited) serving as a polyol resin | 15 parts |

-continued

| | |
|---|---|
| A blocked isocyanate (product name: Sumidur 3175, manufactured by Sumika Bayer Urethane Co., Ltd.) | 15 parts |

Those materials were dissolved in a mixed solution of 73.5 parts of methyl ethyl ketone and 73.5 parts of 1-butanol. 80.8 Parts of the surface-treated zinc oxide particles and 0.8 part of 2,3,4-trihydroxybenzophenone (manufactured by Tokyo Chemical Industry Co., Ltd.) were added to the solution, and the mixture was subjected to dispersion with a sand mill apparatus using glass beads each having a diameter of 0.8 mm under an atmosphere at 23±3° C. for 3 hours.

Next, the following materials were prepared.

| | |
|---|---|
| A silicone oil (product name: SH28PA, manufactured by Dow Corning Toray Silicone Co., Ltd.) | 0.01 part |
| Crosslinked polymethyl methacrylate (PMMA) particles (product name: TECHPOLYMER SSX-102, manufactured by Sekisui Kasei Co., Ltd., average primary particle diameter: 2.5 μm) | 5.6 parts |

Those materials were added to the solution after dispersion, and the mixture was stirred to prepare a coating liquid for an undercoat layer.

The coating liquid for an undercoat layer was applied onto the support by dip coating, and the resultant coat was dried for 40 minutes at 160° C. to form an undercoat layer having a thickness of 18 μm.

Next, the following materials were prepared.

| | |
|---|---|
| A hydroxygallium phthalocyanine crystal (charge-generating substance) of a crystal form having peaks at Bragg angles 2θ ± 0.2° of 7.4° and 28.2° in CuKα characteristic X-ray diffraction | 20 parts |
| A calixarene compound represented by the following formula (A) | 0.2 part |

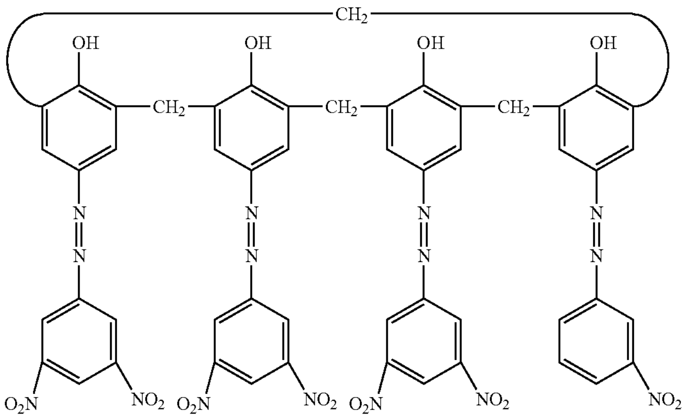

(A)

| | |
|---|---|
| Polyvinyl butyral (product name: S-LEC BX-1, manufactured by Sekisui Chemical Company, Limited) | 10 parts |
| Cyclohexanone | 600 parts |

Those materials were loaded into a sand mill using glass beads each having a diameter of 1 mm, and the mixture was subjected to dispersion treatment for 4 hours. After that, 700 parts of ethyl acetate was added to the dispersed product to prepare a coating liquid for a charge-generating layer. The coating liquid for a charge-generating layer was applied onto the undercoat layer by dip coating, and the resultant coat was dried for 15 minutes at 80° C. to form a charge-generating layer having a thickness of 0.17 μm.

Next, the following materials were prepared.

| | |
|---|---|
| A compound (charge-transporting substance) represented by the following formula (B) | 30 parts |
| A compound (charge-transporting substance) represented by the following formula (C) | 60 parts |
| A compound (charge-transporting substance) represented by the following formula (D) | 10 parts |

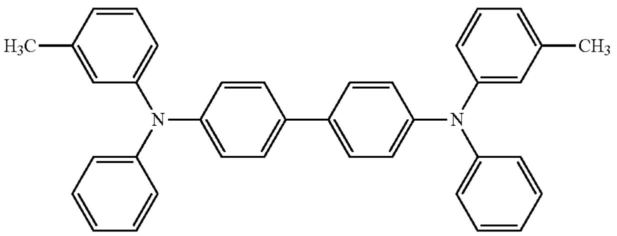

(B)

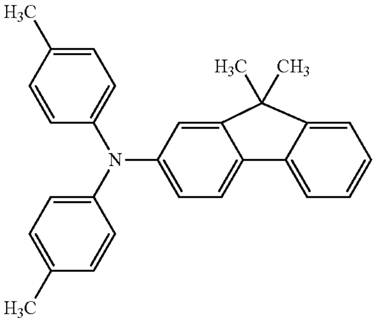

(C)

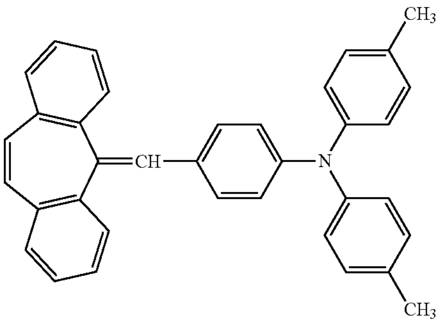

(D)

| | |
|---|---|
| A polycarbonate resin (product name: IUPILON Z400, manufactured by Mitsubishi Engineering-Plastics Corporation, bisphenol Z-type polycarbonate) | 100 parts |
| A polycarbonate having copolymerization units represented by the following formula (E-1) and the following formula (E-2) (x/y = 0.95/0.05: viscosity-average molecular weight Mv: 20,000) | 0.02 part |

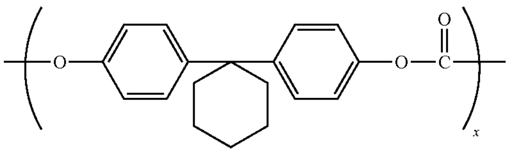

(E-1)

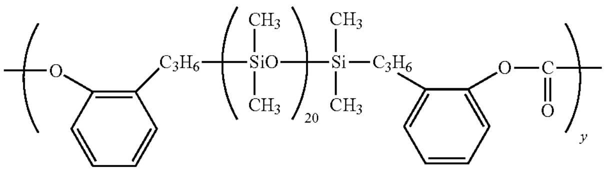

(E-2)

Those materials were dissolved in a mixed solvent of 600 parts of mixed xylene and 200 parts of dimethoxymethane to prepare a coating liquid for a charge-transporting layer. The coating liquid for a charge-transporting layer was applied onto the charge-generating layer by dip coating to form a coat, and the resultant coat was dried for 30 minutes at 100° C. to form a charge-transporting layer having a thickness of 18 μm.

Next, a mixed solvent of 20 parts of 1,1,2,2,3,3,4-heptafluorocyclopentane (product name: ZEORORA H, manufactured by Zeon Corporation) and 20 parts of 1-propanol was filtered with a polyflon filter (product name: PF-040, manufactured by Advantec Toyo Kaisha, Ltd.).

In addition, the following materials were prepared.

| | |
|---|---|
| A hole-transportable compound represented by the following formula (F) | 90 parts |
| 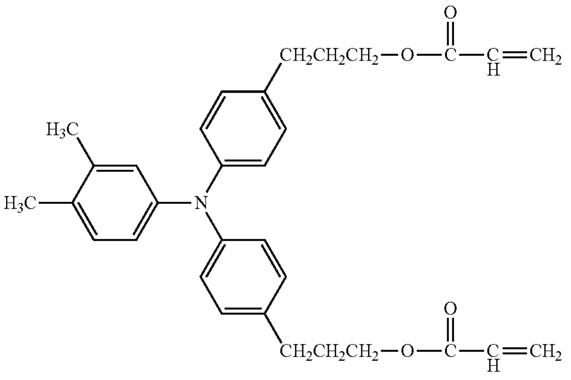 (F) | |
| 1,1,2,2,3,3,4-Heptafluorocyclopentane | 70 parts |
| 1-Propanol | 70 parts |

Those materials were added to the mixed solvent. The mixture was filtered with a polyflon filter (product name: PF-020, manufactured by Advantec Toyo Kaisha, Ltd.) to prepare a coating liquid for a second charge-transporting layer (protective layer). The coating liquid for a second charge-transporting layer was applied onto the charge-transporting layer by dip coating, and the resultant coat was dried in the atmosphere for 6 minutes at 50° C. After that, in nitrogen, the coat was irradiated with electron beams for 1.6 seconds under the conditions of an acceleration voltage of 70 kV and an absorbed dose of 8,000 Gy while the support (irradiation target body) was rotated at 200 rpm. Subsequently, the coat was heated by increasing its temperature from 25° C. to 125° C. in nitrogen over 30 seconds. The oxygen concentrations of the atmosphere at the time of the electron beam irradiation and at the time of the heating after the irradiation were each 15 ppm. Next, the coat was subjected to heating treatment in the atmosphere for 30 minutes at 100° C. to form a 5-micrometer thick second charge-transporting layer (protective layer) cured by the electron beams.

Next, a linear groove was formed on the surface of the protective layer with a polishing sheet (product name: GC3000, manufactured by Riken Corundum Co., Ltd.). The feeding speed of the polishing sheet was set to 40 mm/min, the number of revolutions of the product to be processed was set to 240 rpm, and the pressing pressure of the polishing sheet against the product to be processed was set to 7.5 $N/m^2$. The feeding direction of the polishing sheet and the rotation direction of the product to be processed were set to be the same direction. In addition, a backup roller having an outer diameter of 40 cm and an Asker C hardness of 40 was used. The linear groove was formed in the peripheral surface of the product to be processed under the foregoing conditions over 10 seconds.

Thus, Photosensitive Member A-1 was produced.

(Production Examples of Photosensitive Member A-2 to Photosensitive Member A-9, Photosensitive Member B-1 to Photosensitive Member B-3, and Photosensitive Member C-1 to Photosensitive Member C-14)

Electrophotographic photosensitive members were each produced in exactly the same manner as in Photosensitive Member A-1 except that a support shown in Table 2 was used. The resultant electrophotographic photosensitive members are referred to as "Photosensitive Member A-2 to Photosensitive Member A-9, Photosensitive Member B-1 to Photosensitive Member B-3, and Photosensitive Member C-1 to Photosensitive Member C-14."

[Potential Evaluation]

Two Photosensitive Members A-1 were prepared, and one of the photosensitive members was stored under an environment at 23° C. and 50% RH for 60 days, while the other was stored under an environment at 45° C. and 95% RH for 60 days.

The surface potential of each of the electrophotographic photosensitive members was measured as follows: a cartridge for development was removed from an evaluation apparatus (product name: imagePRESS C910, manufactured by Canon Inc.); a potential probe (product name: model 6000B-8, manufactured by Trek, Inc.) was set in the position of the cartridge; and the measurement was performed with a surface potentiometer (model 344: manufactured by Trek, Inc.). The position of the probe was set to the center position in the axial direction of the electrophotographic photosensitive member.

First, under an environment at 30° C. and 80% RH, the dark potential (Vd) of the electrophotographic photosensitive member stored under the environment at 23° C. and 50% RH out of the above-mentioned two electrophotographic photosensitive members was adjusted to −600 V. Next, the exposure light quantity of an exposing apparatus was adjusted to 0.25 $\mu J/cm^2$.

The light potential of the electrophotographic photosensitive member was measured at the center position in the axial direction thereof at a sampling rate of 1 μs. After that, an average in one circumference of the electrophotographic photosensitive member was calculated, and was adopted as an initial potential. Next, the cartridge for development was returned to the original position, and automatic gradation correction was performed with the evaluation apparatus, followed by continuous printing of an A3 full-surface halftone image on 3,000 sheets. After that, the potential probe was set in the position of the cartridge again, and an average in one circumference of the electrophotographic photosensitive member was calculated by the same method as that of the measurement of the initial potential described above. The average was adopted as a potential after endurance. A difference (potential after endurance-initial potential) was calculated, and the average of the differences was calculated as the short-term potential fluctuation value (NΔVL) of the electrophotographic photosensitive member stored under the environment at 23° C. and 50% RH.

Further, exactly the same measurement as that of the (NΔVL) was performed except that the electrophotographic photosensitive member stored under the environment at 45° C. and 95% RH out of the above-mentioned two electrophotographic photosensitive members was used, and the measured value was calculated as the short-term potential fluctuation value (HΔVL) of the electrophotographic photosensitive member stored under the environment at 45° C. and 95% RH. The larger one of the (NΔVL) or the (HΔVL) was adopted as a fluctuation maximum.

Finally, a difference due to the storage environments was determined by calculating the absolute value of (NΔVL)-(HΔVL).

Ranking was performed as described below.

Fluctuation maximum

A: 5 V or less

B: From 6 to 10 V

C (comparable to the related-art product): 11 V or more

Absolute value of (NΔVL)-(HΔVL) (storage environment difference)

A: Less than 3 V

B: From 3 to 4 V

C: 5 V or more

The results are shown in Table 2.

[Crystal Orientation]

Positions corresponding to 1/8, 2/8, 3/8, 4/8, 5/8, 6/8, and 7/8 of the full length of the support from one of the ends thereof in the axial direction thereof are determined. Further, at each of the positions, the support is divided into four parts of 90° each in the circumferential direction thereof. At each of the 28 points where the dividing lines in the axial direction and the dividing lines in the circumferential direction intersect, a 10-millimeter square fragment is cut out so that the point of intersection between the dividing line in the axial direction and the dividing line in the circumferential direction is at its center. The protective layer was removed with a polishing sheet, followed by the removal of the photosensitive layer with methyl ethyl ketone. After that, the surface of the support was exposed and subjected to mirror finishing by buffing. Next, the resultant was treated by being immersed in an aqueous solution of sodium hydroxide for 1 minute to provide a sample for crystal orientation observation.

Observation by the SEM-EB SP method was performed for a 100-micrometer square region set so that the center on the surface of the resultant sample, that is, the above-mentioned point of intersection between the dividing line in the axial direction of the support and the dividing line in the circumferential direction thereof was at its center. The ratio of the area occupied by Al crystal grains having each crystal orientation was calculated. The results are shown in Table 2.

TABLE 2

| | Photosensitive member | Support | Crystal: Ratio of area occupied by crystal grain having (γ) [%] | Crystal: Ratio of sum of areas occupied by crystal grain having (α) and crystal grain having (β) [%] | Crystal: Value of ratio of area occupied by crystal grain having (α) to area occupied by crystal grain having (β) | Potential evaluation: (NΔVL) [V] | Potential evaluation: (HΔVL) [V] | Potential evaluation: Fluctuation maximum [V] | Potential evaluation: Storage environment difference \|(NΔVL) − (HΔVL)\| [V] | Potential evaluation: Evaluation rank of fluctuation maximum | Potential evaluation: Evaluation rank of storage environment difference |
|---|---|---|---|---|---|---|---|---|---|---|---|
| Example A-1 | Photosensitive member A-1 | Support A-1 | 2 | 98 | 48/52 | 2 | 2 | 2 | 0 | A | A |
| Example A-2 | Photosensitive member A-2 | Support A-2 | 3 | 98 | 55/45 | 2 | 1 | 2 | 0 | A | A |
| Example A-3 | Photosensitive member A-3 | Support A-3 | 2 | 98 | 59/41 | 4 | 1 | 4 | 3 | A | B |
| Example A-4 | Photosensitive member A-4 | Support A-4 | 2 | 98 | 45/55 | 2 | 2 | 2 | 0 | A | A |
| Example A-5 | Photosensitive member A-5 | Support A-5 | 3 | 98 | 42/58 | 1 | 4 | 4 | 3 | A | B |
| Example A-6 | Photosensitive member A-6 | Support A-6 | 5 | 95 | 51/49 | 2 | 2 | 2 | 0 | A | A |
| Example A-7 | Photosensitive member A-7 | Support A-7 | 10 | 90 | 49/51 | 6 | 6 | 6 | 0 | B | A |
| Example A-8 | Photosensitive member A-8 | Support A-8 | 10 | 90 | 58/42 | 9 | 5 | 9 | 4 | B | B |
| Example A-9 | Photosensitive member A-9 | Support A-9 | 10 | 90 | 42/58 | 6 | 9 | 9 | 3 | B | B |

TABLE 2-continued

| | Photosensitive member | Support | Crystal: Ratio of area occupied by crystal grain having (γ) [%] | Crystal: Ratio of sum of areas occupied by crystal grain having (α) and crystal grain having (β) [%] | Crystal: Value of ratio of area occupied by crystal grain having (α) to area occupied by crystal grain having (β) | Potential evaluation: (NΔVL) [V] | Potential evaluation: (HΔVL) [V] | Potential evaluation: Fluctuation maximum [V] | Potential evaluation: Storage environment difference \|(NΔVL) − (HΔVL)\| [V] | Potential evaluation: Evaluation rank of fluctuation maximum | Potential evaluation: Evaluation rank of storage environment difference |
|---|---|---|---|---|---|---|---|---|---|---|---|
| Example B-1 | Photosensitive member B-1 | Support B-1 | 3 | 97 | 50/50 | 2 | 2 | 2 | 0 | A | A |
| Example B-2 | Photosensitive member B-2 | Support B-2 | 2 | 98 | 59/41 | 5 | 1 | 5 | 4 | A | B |
| Example B-3 | Photosensitive member B-3 | Support B-3 | 2 | 98 | 42/58 | 1 | 5 | 5 | 4 | A | B |
| Comparative Example C-1 | Photosensitive member C-1 | Support C-1 | 35 | 65 | 49/51 | 12 | 12 | 12 | 0 | C | A |
| Comparative Example C-2 | Photosensitive member C-2 | Support C-2 | 33 | 67 | 54/46 | 13 | 13 | 13 | 0 | C | A |
| Comparative Example C-3 | Photosensitive member C-3 | Support C-3 | 33 | 67 | 55/45 | 12 | 12 | 12 | 0 | C | A |
| Comparative Example C-4 | Photosensitive member C-4 | Support C-4 | 35 | 65 | 43/57 | 11 | 15 | 15 | 4 | C | B |
| Comparative Example C-5 | Photosensitive member C-5 | Support C-5 | 34 | 66 | 50/50 | 12 | 12 | 12 | 0 | C | A |
| Comparative Example C-6 | Photosensitive member C-6 | Support C-6 | 34 | 66 | 50/50 | 11 | 11 | 11 | 0 | C | A |
| Comparative Example C-7 | Photosensitive member C-7 | Support C-7 | 39 | 61 | 51/49 | 11 | 12 | 12 | 1 | C | A |
| Comparative Example C-8 | Photosensitive member C-8 | Support C-8 | 30 | 70 | 56/44 | 12 | 13 | 13 | 1 | C | A |
| Comparative Example C-9 | Photosensitive member C-9 | Support C-9 | 34 | 66 | 50/50 | 11 | 11 | 11 | 0 | C | A |
| Comparative Example C-10 | Photosensitive member C-10 | Support C-10 | 38 | 62 | 42/58 | 12 | 11 | 12 | 1 | C | A |
| Comparative Example C-11 | Photosensitive member C-11 | Support C-11 | 55 | 45 | 69/31 | 16 | 11 | 16 | 5 | C | C |
| Comparative Example C-12 | Photosensitive member C-12 | Support C-12 | 58 | 42 | 64/36 | 16 | 11 | 16 | 5 | C | C |
| Comparative Example C-13 | Photosensitive member C-13 | Support C-13 | 15 | 85 | 41/59 | 12 | 12 | 12 | 0 | C | A |
| Comparative Example C-14 | Photosensitive member C-14 | Support C-14 | 10 | 90 | 33/67 | 3 | 10 | 10 | 7 | B | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075310, filed Apr. 28, 2022, and Japanese Patent Application No. 2023-052157, filed Mar. 28, 2023, which are hereby incorporated by reference herein in their entirety.

What is claimed is:

1. An electrophotographic photosensitive member comprising:

a support having a cylindrical shape; and a photosensitive layer, wherein the support has a surface formed of Al and/or an Al alloy, wherein the surface of the support comprises Al crystal grains having:

(α) a plane at −15° or more and less than +15° with respect to a {001} orientation;

(β) a plane at −15° or more and less than +15° with respect to a {101} orientation; and (γ) a plane at −15° or more and less than +15° with respect to a {111} orientation, and wherein a ratio of an area occupied by the Al crystal grain having the (γ) to a total area of the surface of the support is 10% or less, and a value of a ratio of an area occupied by the Al crystal grain having the (α) to an area occupied by the Al crystal grain having the (β) is more than 4/6 and less than 6/4.

2. The electrophotographic photosensitive member according to claim 1, wherein the value of the ratio of the area occupied by the Al crystal grain having the (α) to the area occupied by the Al crystal grain having the (β) is from 41/59 to 59/41.

3. The electrophotographic photosensitive member according to claim 1, wherein the value of the ratio of the area occupied by the Al crystal grain having the (α) to the area occupied by the Al crystal grain having the (β) is from 45/55 to 55/45.

4. The electrophotographic photosensitive member according to claim 1, wherein the ratio of the area occupied by the Al crystal grain having the (γ) to the total area of the surface of the support is 5% or less.

5. The electrophotographic photosensitive member according to claim 1, wherein the surface of the support is formed of an Al alloy containing 0.05 to 0.2 mass % of Cu and 1.0 to 1.5 mass % of Mn.

6. The electrophotographic photosensitive member according to claim 1, wherein the surface of the support is formed of an Al alloy containing 0.2 to 0.6 mass % of Si and 0.45 to 0.9 mass % of Mg.

7. A process cartridge comprising:

an electrophotographic photosensitive member; and at least one unit selected from the group consisting of: a charging unit; a developing unit; and a cleaning unit, the process cartridge integrally supporting the electrophotographic photosensitive member and the at least one unit, and being removably mounted onto a main body of an electrophotographic apparatus, wherein the electrophotographic photosensitive member is an electrographic photosensitive member including:

a support having a cylindrical shape; and a photosensitive layer, wherein the support has a surface formed of Al and/or an Al alloy, wherein the surface of the support comprises Al crystal grains having:

(α) a plane at −15° or more and less than +15° with respect to a {001} orientation;

(β) a plane at −15° or more and less than +15° with respect to a {101} orientation; and (γ) a plane at −15° or more and less than +15° with respect to a {111} orientation, and wherein a ratio of an area occupied by the Al crystal grain having the (γ) to a total area of the surface of the support is 10% or less, and a value of a ratio of an area occupied by the Al crystal grain having the (α) to an area occupied by the Al crystal grain having the (β) is more than 4/6 and less than 6/4.

8. An electrophotographic apparatus comprising:

an electrophotographic photosensitive member;

a charging unit;

an exposing unit;

a developing unit; and a transferring unit, wherein the electrophotographic photosensitive member is an electrographic photosensitive member including:

a support having a cylindrical shape; and a photosensitive layer, wherein the support has a surface formed of Al and/or an Al alloy, wherein the surface of the support comprises Al crystal grains having:

(α) a plane at −15° or more and less than +15° with respect to a {001} orientation;

(β) a plane at −15° or more and less than +15° with respect to a {101} orientation; and (γ) a plane at −15° or more and less than +15° with respect to a {111} orientation, and wherein a ratio of an area occupied by the Al crystal grain having the (γ) to a total area of the surface of the support is 10% or less, and a value of a ratio of an area occupied by the Al crystal grain having the (α) to an area occupied by the Al crystal grain having the (β) is more than 4/6 and less than 6/4.

* * * * *